United States Patent
Schmidt et al.

(10) Patent No.: US 10,457,303 B2
(45) Date of Patent: Oct. 29, 2019

(54) VIBRATION NOTIFICATIONS RECEIVED FROM VIBRATION SENSORS

(71) Applicant: HEWLETT PACKARD ENTERPRISE DEVELOPMENT LP, Houston, TX (US)

(72) Inventors: Larry Schmidt, Atlanta, GA (US); Satwant Kaur, Mountain View, CA (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 340 days.

(21) Appl. No.: 15/511,181

(22) PCT Filed: Nov. 14, 2014

(86) PCT No.: PCT/US2014/065781
§ 371 (c)(1),
(2) Date: Mar. 14, 2017

(87) PCT Pub. No.: WO2016/076891
PCT Pub. Date: May 19, 2016

(65) Prior Publication Data
US 2017/0267266 A1 Sep. 21, 2017

(51) Int. Cl.
*B61L 23/04* (2006.01)
*B61L 23/14* (2006.01)
(Continued)

(52) U.S. Cl.
CPC .............. *B61L 23/044* (2013.01); *B61L 1/164* (2013.01); *B61L 23/045* (2013.01); *B61L 23/14* (2013.01);
(Continued)

(58) Field of Classification Search
CPC .... B61L 23/044; B61L 23/14; B61L 27/0038; B61L 1/164; B61L 23/045;
(Continued)

(56) References Cited

U.S. PATENT DOCUMENTS

| 5,743,495 A | 4/1998 | Welles, II et al. |
| 7,364,123 B2 | 4/2008 | Welles et al. |

(Continued)

FOREIGN PATENT DOCUMENTS

| CN | 102530028 A | 7/2012 |
| CN | 103847761 A | 6/2014 |

(Continued)

OTHER PUBLICATIONS

International Search Report and Written Opinion dated Jul. 7, 2015, PCT Patent Application No. PCT/US2014/065781, filed Nov. 14, 2014, Korean Intellectual Property Office.

(Continued)

*Primary Examiner* — Daniel Pihulic
(74) *Attorney, Agent, or Firm* — Sheppard Mullin Richter & Hampton LLP

(57) ABSTRACT

Example implementations relate to receiving vibration notifications from vibration sensors. In example implementations, a subset of a plurality of vibration sensors from which vibration notifications are expected may be identified based on a position of a train along a track. The plurality of vibration sensors may be arranged in a predetermined order on the track. Whether vibration notifications have not been received from consecutive, with respect to the predetermined order, vibration sensors in the subset may be determined.

15 Claims, 5 Drawing Sheets

(51) Int. Cl.
- *B61L 27/00* (2006.01)
- *G01H 11/04* (2006.01)
- *G01H 11/08* (2006.01)
- *H02N 2/18* (2006.01)
- *B61L 1/16* (2006.01)
- *G01H 1/00* (2006.01)
- *G01H 11/00* (2006.01)

(52) U.S. Cl.
CPC ............ *B61L 27/0038* (2013.01); *G01H 1/00* (2013.01); *G01H 11/00* (2013.01); *G01H 11/04* (2013.01); *G01H 11/08* (2013.01); *H02N 2/186* (2013.01); *B61L 2201/00* (2013.01)

(58) Field of Classification Search
CPC ..... B61L 2201/00; G01H 11/00; G01H 11/04; G01H 1/00; G01H 11/08; H02N 2/186
See application file for complete search history.

(56) References Cited

U.S. PATENT DOCUMENTS

| | | | |
|---|---|---|---|
| 8,423,240 B2 | 4/2013 | Mian | |
| 2017/0267266 A1* | 9/2017 | Schmidt | ................. G01H 11/08 |

FOREIGN PATENT DOCUMENTS

| | | | | |
|---|---|---|---|---|
| JP | 2007147412 | | 6/2007 | |
| JP | 2012158919 | | 8/2012 | |
| KR | 10-2009-0059174 | | 6/2009 | |
| WO | WO-2014027977 | | 2/2014 | |
| WO | WO-2016076891 A1 | * | 5/2016 | ............. G01H 11/08 |

OTHER PUBLICATIONS

Wu etal—"A Railway Running Status Monitoring System Based on Energy Harvesting Wireless Sensor Network"—JDCTA v 6 n 17—Sep. 2012—10 pages.

* cited by examiner

VIBRATION NOTIFICATIONS RECEIVED FROM VIBRATION SENSORS

CLAIM FOR PRIORITY

The present application is a national stage filing under 35 U.S.C. § 371 of PCT application number PCT/US2014/065781, having an international filing date of Nov. 14, 2014, the disclosure of which is hereby incorporated by reference in its entirety.

BACKGROUND

Vehicles that travel along tracks may be used to transport humans as well as cargo. A vehicle moving along a track may cause the track to vibrate, and such vibrations may be detected along portions of the track that are miles away from the physical location of the vehicle. Sensors that include piezoelectric or magnetostrictive materials may be placed along the track, and may convert energy from vibrations into electric charge.

BRIEF DESCRIPTION OF THE DRAWINGS

The following detailed description references the drawings, wherein.

DETAILED DESCRIPTION

Trains are used to transport humans as well as cargo. As used herein, the term "train" should be understood to refer to a vehicle that travels on at least one rail. Examples of trains include, but are not limited to, railroad locomotives and railroad cars, subway/metro cars, trams, monorail cars, commuter rail cars, and light rail vehicles. A rail, or rails, on which a train travels, along with supporting structures (e.g., railroad ties, fasteners, ballast) of the rail(s), may be collectively referred to herein as a "track". A crack or break in a track may cause a train to derail, which may result in many people being injured or even killed (e.g., if the train is carrying people, or if the train hits people or cars/buildings with people inside after derailing). Derailed trains may also cause property damage, for example to cargo being carried by the train and/or property hit by the train after it derails. The ability to warn a train operator about a crack or break in a track before the train reaches the location of the crack/break may prevent the train from derailing, as well as save lives and minimize monetary losses. In light of the above, the present disclosure provides for receiving vibration notifications from vibration sensors along tracks, allowing breaks/cracks in tracks to be detected and avoided.

Figure 1:
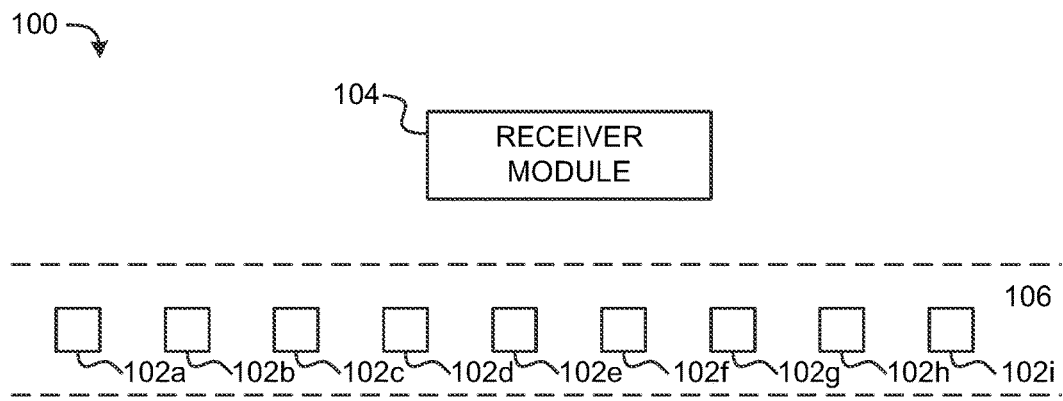
FIG. 1 is a block diagram of an example system that includes a receiver module and a plurality of vibration sensors.

Referring now to the figures, FIG. 1 is a block diagram of an example system 100 that includes a receiver module 104 and vibration sensors 102*a-i*. As used herein, the terms "include", "have", and "comprise" are interchangeable and should be understood to have the same meaning. Vibration sensors 102*a-i* may be arranged in a predetermined order on track 106. Each vibration sensor 102*a-i* may be on a railroad tie of track 106, or on a rail of track 106 (e.g., if track 106 is a ballastless track). In some implementations, some vibration sensors may be on a rail, and others may be on railroad ties. A vibration sensor may be attached to track 106 using any suitable technique. For example, a vibration sensor may be screwed into a bracket attached to a rail or railroad tie.

Although nine vibration sensors are shown in FIG. 1, it should be understood that system 100 may include more vibration sensors or less vibration sensors, and that the concepts discussed herein may be applicable to a track having more or less than the number of vibration sensors shown in FIG. 1. Vibration sensors may be evenly spaced on track 106. For example, vibration sensors may be placed every half-mile along track 106, or every mile. Any other suitable spacing may be used, and the distances between consecutive vibration sensors may vary along track 106. In some implementations, the spacing of vibration sensors may vary based on the terrain and/or environment in which track 106 is laid. For example, for a segment of track 106 in a plains region where line of sight extends for miles, vibration sensors may be placed every mile. For a segment of track 106 in a mountainous region, and/or that goes through tunnels, and/or that twists and turns frequently, vibration sensors may be placed every quarter-mile or half-mile.

Each vibration sensor along track 106 (e.g., each of vibration sensors 102*a-i*) may generate electrical charge in response to vibrations. For example, a vibration sensor may include a piezoelectric material (e.g., piezoelectric crystal) or magnetostrictive material. Vibrations along track 106 may be caused by movement of a train on track 106, and may be felt more strongly by vibration sensors closer to the train. Each vibration sensor in system 100 may transmit vibration notifications in response to vibration levels above a threshold level. In some implementations, a vibration sensor may transmit a vibration notification when an amount of electrical charge generated corresponds to a vibration level above a threshold level. It should be understood that a vibration sensor may transmit a vibration notification in response to a vibration level equal to the threshold level.

A vibration notification may be, for example, a logical '1' or '0', or a multi-bit value. A vibration sensor may transmit a vibration notification each time a determination is made that a vibration level experienced by the vibration sensor equals or exceeds a threshold level. The same value may be transmitted as the vibration notification each time such a determination is made. If a vibration level experienced by the vibration sensor is below the threshold level, the vibration sensor may not transmit anything.

The threshold level may be set based on how much vibration is experienced by a vibration sensor within a certain distance of a train on track 106 when track 106 has no defects (e.g., cracks or breaks). For example, the threshold level may be set such that when a train is moving along a defect-free part of track 106, all vibration sensors within two miles of the train experience vibrations above the threshold level. When a train is at a given position on track 106, each vibration sensor within two miles in front of the train and each vibration sensor within two miles behind the train may transmit a vibration notification. If track 106 is broken or cracked at some distance less than two miles from the train, the vibrations caused by movement of the train may not fully propagate along track 106 beyond the break/crack, and thus a vibration sensor located between the break/crack and a 2-mile distance from the train may not experience vibrations above the threshold level despite being within 2 miles of the train, and therefore not transmit a vibration notification.

Each vibration sensor along track 106 may transmit, with each vibration notification, a sensor identification code stored on the respective vibration sensor. A sensor identification code may be a string of numbers, letters, and/or other symbols that correspond to a vibration sensor, and may be used to distinguish a vibration sensor from other vibration sensors. A sensor identification code stored on a particular vibration sensor may be unique to that particular vibration sensor (e.g., each vibration sensor along track 106 may have a different sensor identification code). Vibration notifications and sensor identification codes transmitted by vibration sensors along track 106 may be received by receiver module 104, which may use received sensor identification codes to determine from which vibration sensors vibration notifications have been received. In some implementations, vibration notifications and sensor identification codes may be wirelessly transmitted and received.

Receiver module 104 may be communicatively coupled to vibration sensors 102*a-i* and to a train on track 106. In some implementations, receiver module 104 may be on the train. For example, receiver module 104 may be built into a control panel on the train, or implemented as an application on a mobile device on the train (e.g. the application may be downloaded onto a smartphone, laptop, or wearable device used by a conductor/engineer on the train). In some implementations, receiver module 104 may be in a location from which the train receives control signals. For example, the train may be remotely controlled from a central command center (e.g., the train may receive signals from the central command center to start, stop, and turn), and receiver module 104 may be built into a control panel at the central command center, or implemented as an application on a mobile device in the central command center (e.g. the application may be downloaded onto a smartphone, laptop, or wearable device used by an operator in the central command center). In some implementations, receiver module 104 may be communicatively coupled to all vibration sensors on track 106 and to all trains running on track 106.

Receiver module 104 may receive vibration notifications and sensor identification codes from vibration sensors 102*a-i*. Receiver module 104 may identify, based on a position of a train along track 106, a subset of vibration sensors 102*a-i* from which vibration notifications are expected. The vibration sensors in the subset may be the vibration sensors in the vicinity of the train that should experience vibration levels above a threshold level if track 106 is defect-free. For example, if a threshold level is set for vibration sensors 102*a-i* (and other vibration sensors along track 106) such that when a train is moving along a defect-free part of track 106, all vibration sensors within three miles of the train experience vibrations above the threshold level, and if vibration sensors 102*a-i* are spaced one mile apart and a train is somewhere between vibration sensors 102*d* and 102*e*, receiver module 104 may identify the subset of vibration sensors 102*b-g*. If the train is somewhere between vibration sensors 102*c* and 102*d*, receiver module 104 may identify the subset of vibration sensors 102*a-f*. In some implementations, the subset may not include vibration sensors behind the train, in which case the subset may, for example, include vibration sensors 102*b-d* and not vibration sensors 102*e-g*, if the train is between vibration sensors 102*d* and 102*e* and moving toward vibration sensor 102*d*. Receiving vibration notifications from all vibration sensors in the identified subset may indicate that the segment of track 106 that includes such sensors is defect-free.

A vibration notification not being received from one of the vibration sensors in an identified subset may be indicative of a faulty sensor or a broken/cracked part of a track. The likelihood of a broken/cracked part of track increases if expected vibration notifications are not received from two or more vibration sensors in a row. If vibration notifications are received, for example, from vibration sensors 102*b* and 102*d* but not vibration sensor 102*c*, it may be more likely that there is something wrong with vibration sensor 102*c* than that track 106 is broken/cracked somewhere between vibration sensors 102*b* and 102*d*. Receiver module 104 may determine whether vibration notifications have not been received from consecutive, with respect to the predetermined order, vibration sensors in the subset. In some implementations, if some vibration notifications have been received, receiver module 104 may use sensor identification codes received with the vibration notifications to determine which members of the subset transmitted the vibration notifications, and determine whether any of the rest of the members of the subset are adjacent to one another in the predetermined order. Continuing with the above example of the identified subset of vibration sensors 102*b-g*, receiver module 104 may determine whether vibration notifications have not been received from any consecutive pairs of vibration sensors within the subset (e.g., vibration sensors 102*b* and 102*c*, vibration sensors 102*c* and 102*d*, and so on). In some implementations, receiver module 104 may determine whether vibration notifications have not been received from any group of three consecutive vibration sensors within the subset (e.g., vibration sensors 102*b-d*, vibration sensors 102*c-e*, and so on), or any other number of consecutive vibration sensors.

In some implementations, receiver module 104 may store the predetermined order of vibration sensors 102*a-i*, and a list of sensor identification codes and data indicative of physical locations of the respective vibration sensors. For example, receiver module 104 may store a list of sensor identification codes, corresponding to vibration sensors 102*a-i*, in the order that vibration sensors 102*a-i* are placed on track 106, and geographic coordinates for the physical location of at least some of the vibration sensors. In some implementations, receiver module 104 may store indications of physical locations of some vibration sensors relative to those of other vibration sensors (e.g., vibration sensor 102*a* is at coordinates XYZ, vibration sensor 102*b* is half a mile east of vibration sensor 102*a*, vibration sensor 102*c* is one mile east of vibration sensor 102*a*, etc.; or vibration sensor 102*a* is at coordinates XYZ and vibration sensors 102*b-i* are evenly spaced every quarter-mile to the south in that order).

Receiver module 104 may determine, based on the list, a physical location of a vibration sensor, in an identified subset, from which a vibration notification was not received. For example, receiver module 104 may determine that a vibration notification was expected but not received from vibration sensor 102*e*, and may use geographic coordinates in a stored list to determine where vibration sensor 102*e* is physically located. The absence of an expected vibration notification from vibration sensor 102*e* may indicate that vibration sensor 102*e* has malfunctioned, or that there is a defect in a portion of track 106 between vibration sensors 102*d* and 102*f*. The latter may be more likely if an expected vibration notification is also not received from vibration sensor 102*d* and/or 102*f*. Receiver module 104 may request a repair for the physical location. For example, receiver module 104 may request that a sensor repair team be sent to the physical location of vibration sensor 102*e* (e.g., if vibration notifications have been received from vibration sensors 102*d* and 102*f* but not 102*e*), or that a track repair team check the portion of track 106 between vibration sensors 102*d* and 102*f* for breaks/cracks and repair any such breaks/cracks (e.g., if vibration notifications were expected but not received from at least two consecutive vibration sensors of vibration sensors 102*d-f*).

In some implementations, vibration sensors in the subset identified by receiver module 104 may be vibration sensors that a train is traveling toward and that are less than a predetermined distance from the train. For example, a train may be between vibration sensors 102*h* and 102*i* traveling toward vibration sensor 102*h*, and the identified subset may be vibration sensors 102*e-h*. Receiver module 104 may activate emergency brakes of the train in response to a determination that vibration notifications have not been received from consecutive vibration sensors in the subset. Continuing with the above example, receiver module 104 may activate emergency brakes of the train if vibration notifications were not received from vibration sensors 102*e* and 102*f*. In some implementations, receiver module 104 may trigger an alarm (e.g., to indicate that the train should be stopped or re-routed) if expected vibration notifications are not received from consecutive vibration sensors in front of the train.

Figure 2:
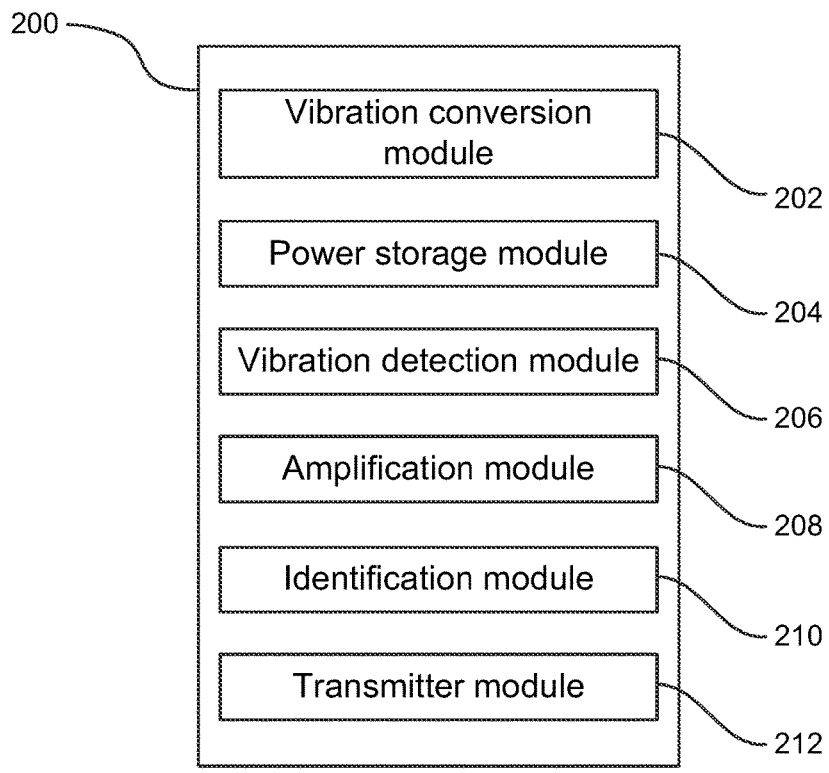
FIG. 2 is a block diagram of an example vibration sensor.

FIG. 2 is a block diagram of an example vibration sensor 200. Vibration sensor 200 may be an implementation of one of vibration sensors 102*a-i* of FIG. 1. In FIG. 2, system 200 includes vibration conversion module 202, power storage module 204, vibration detection module 206, amplification module 208, identification module 210, and transmitter module 212. A module may include a set of instructions encoded on a machine-readable storage medium and executable by a processor. In addition or as an alternative, a module may include a hardware device comprising electronic circuitry for implementing the functionality described below.

Vibration conversion module 202 may generate electrical charge in response to vibrations experienced by vibration sensor 200. Vibration sensor 200 may be placed on a track, and may experience vibrations when a train is moving on the track in the vicinity (e.g., within a few miles) of vibration sensor 200. The strength of vibrations (i.e., vibration level) experienced by vibration sensor 200 may be inversely proportional to its distance from a train on the track; the strongest vibrations may be experienced when a train passes directly over vibration sensor 200. Vibration conversion module 202 may include, for example, a piezoelectric material (e.g., piezoelectric crystal) or magnetostrictive material.

Power storage module 204 may store generated electrical charge. Power storage module 204 may include, for example, a capacitor for storing electrical charge that is generated by vibration conversion module 202 when a train is moving near vibration sensor 200. Electrical charge stored in power storage module 204 may be used to power other modules (e.g., amplification module 208, as discussed further below) in vibration sensor 200. Power storage module 204 may accumulate enough electrical charge from track vibrations to allow vibration sensor 200 to operate without another (e.g., external) power source.

Vibration detection module 206 may determine whether vibration levels experienced by vibration sensor 200 exceed a threshold level. The threshold level may be set based on how much vibration is experienced by a vibration sensor within a certain distance of a train, on a track on which vibration sensor 200 is placed, when the track has no defects, as discussed above with respect to FIG. 1. In some implementations, vibration detection module 206 may include a comparator for comparing the threshold level with a vibration level experienced by vibration sensor 200. In some implementations, vibration detection module 206 may determine whether an amount of electrical charge generated corresponds to a vibration level above the threshold level.

Amplification module 208 may use electrical charge stored in power storage module 204 to boost electrical signals used to transmit vibration notifications and a sensor identification code. In some implementations, amplification module 208 may boost a signal for a vibration notification for an oncoming train by using electrical charge that was stored in power storage module 204 while the previous train passed over vibration sensor 200. Thus, vibration sensor 200 may use vibrations caused by previous trains to generate electrical charge to boost vibration notifications for future trains, eliminating the need for an external power source.

Identification module 210 may store a sensor identification code for vibration sensor 200. For example, identification module 210 may include a non-volatile register that holds alphanumeric characters of the sensor identification code unique to vibration sensor 200. The (same) sensor identification code may be transmitted with each vibration notification originating from vibration sensor 200.

Transmitter module 212 may wirelessly transmit vibration notifications and the sensor identification code. A vibration notification and sensor identification code may be transmitted in response to vibration levels above a threshold level, as discussed above with respect to FIG. 1. Vibration notifications and the sensor identification code may be wirelessly received by a receiver module (e.g., receiver module 104). If vibration levels experienced by vibration sensor 200 are below the threshold level, transmitter module 212 may not transmit anything, thus minimizing power consumption of vibration sensor 200.

Figure 3:
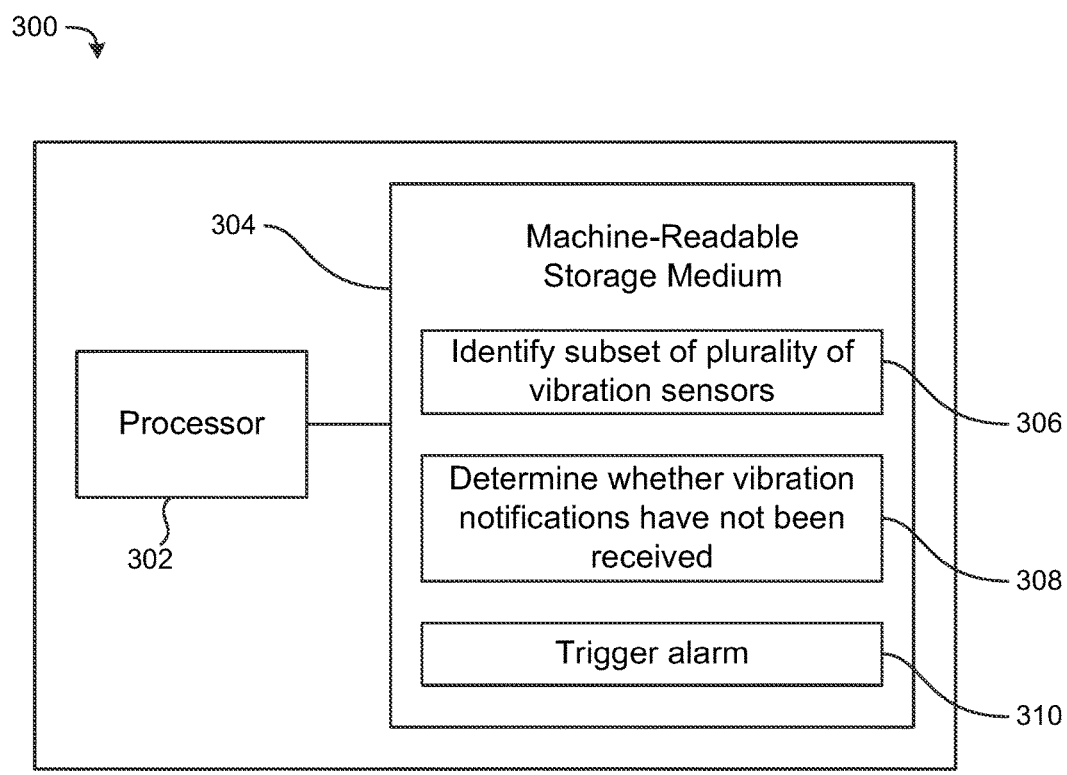
FIG. 3 is a block diagram of an example device that includes a machine-readable storage medium encoded with instructions to enable detection of a condition needing repair along a track.

FIG. 3 is a block diagram of an example device 300 that includes a machine-readable storage medium encoded with instructions to enable detection of a condition needing repair along a track. In some examples, device 300 may implement a receiver module (e.g., receiver module 104 of FIG. 1). Device 300 may be communicatively coupled to a plurality of vibration sensors (e.g., vibration sensors 102*a-i*) on a track (e.g., track 106). In FIG. 3, system 300 includes processor 302 and machine-readable storage medium 304.

Processor 302 may include a central processing unit (CPU), microprocessor (e.g., semiconductor-based microprocessor), and/or other hardware device suitable for retrieval and/or execution of instructions stored in machine-readable storage medium 304. Processor 302 may fetch, decode, and/or execute instructions 306, 308, and 310 to enable detection of a condition needing repair along a track, as described below. As an alternative or in addition to retrieving and/or executing instructions, processor 302 may include an electronic circuit comprising a number of electronic components for performing the functionality of instructions 306, 308, and/or 310.

Machine-readable storage medium 304 may be any suitable electronic, magnetic, optical, or other physical storage device that contains or stores executable instructions. Thus, machine-readable storage medium 304 may include, for example, a random-access memory (RAM), an Electrically Erasable Programmable Read-Only Memory (EEPROM), a storage device, an optical disc, and the like. In some implementations, machine-readable storage medium 304 may include a non-transitory storage medium, where the term "non-transitory" does not encompass transitory propagating signals. As described in detail below, machine-readable storage medium 304 may be encoded with a set of executable instructions 306, 308, and 310.

Instructions 306 may identify, based on a position of a train along a track, a subset of a plurality of vibration sensors from which vibration notifications are expected. The plurality of vibration sensors may be arranged in a predetermined order on the track. In some implementations, the predetermined order of the plurality of vibration sensors may be stored in device 300, and may be used by instructions 306 to identify the subset. The vibration sensors in the subset may be the vibration sensors in the vicinity of the train that should experience vibration levels above a threshold level if the track is defect-free, as discussed above with respect to FIG. 1.

Instructions 308 may determine whether vibration notifications have not been received from consecutive, with respect to the predetermined order, vibration sensors in the subset. In some implementations, if some vibration notifications have been received, instructions 308 may use sensor identification codes received with the vibration notifications to determine which members of the subset transmitted the vibration notifications, and determine whether any of the rest of the members of the subset are adjacent to one another in the predetermined order. In some implementations, instructions 308 may determine whether vibration notifications have not been received from any consecutive pairs of vibration sensors (or from any group of three consecutive vibration sensors, or any other number of consecutive vibration sensors) within the subset, as discussed above with respect to FIG. 1.

Instructions 310 may trigger an alarm in response to a determination that vibration notifications have not been received from consecutive vibration sensors in the subset. Such a determination may indicate that something is wrong with the segment of track that includes the consecutive vibration sensors from which expected vibration notifications were not received (e.g., track may be cracked or broken). In some implementations, the alarm may indicate that the train should be stopped or re-routed. For example, such an alarm may be triggered if the consecutive vibration sensors from which expected vibration notifications were not received are in front of the train (i.e., the train is moving toward such vibration sensors).

Figure 4:
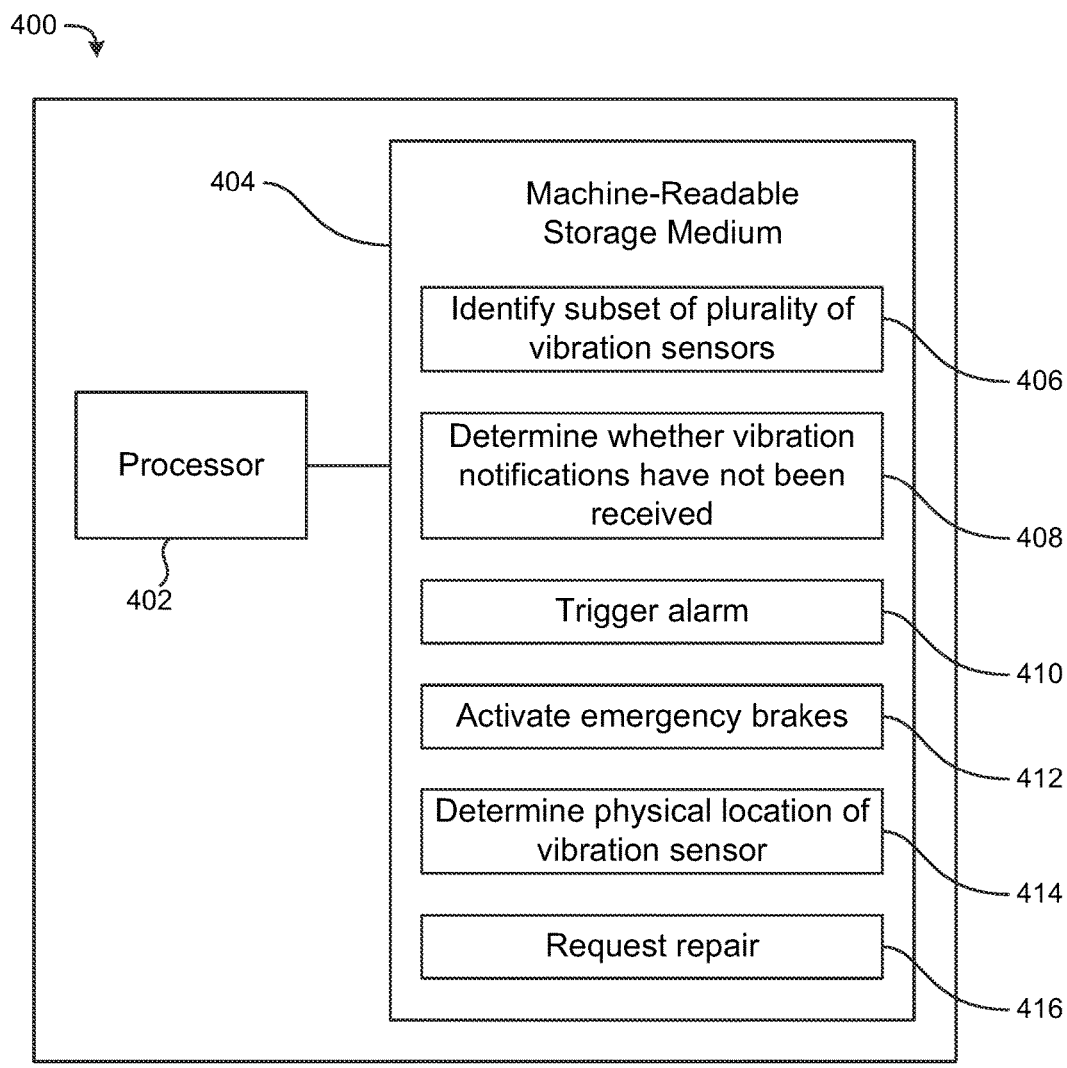
FIG. 4 is a block diagram of an example device that includes a machine-readable storage medium encoded with instructions to enable identification of a location of a condition needing repair along a track.

FIG. 4 is a block diagram of an example device 400 that includes a machine-readable storage medium encoded with instructions to enable identification of a location of a condition needing repair along a track. In some examples, device 400 may implement a receiver module (e.g., receiver module 104 of FIG. 1). Device 400 may be communicatively coupled to a plurality of vibration sensors (e.g., vibration sensors 102a-i) on a track (e.g., track 106). In FIG. 4, system 400 includes processor 402 and machine-readable storage medium 404.

As with processor 302 of FIG. 3, processor 402 may include a CPU, microprocessor (e.g., semiconductor-based microprocessor), and/or other hardware device suitable for retrieval and/or execution of instructions stored in machine-readable storage medium 404. Processor 402 may fetch, decode, and/or execute instructions 406, 408, 410, 412, 414, and 416 to enable identification of a location of a condition needing repair along a track, as described below. As an alternative or in addition to retrieving and/or executing instructions, processor 402 may include an electronic circuit comprising a number of electronic components for performing the functionality of instructions 406, 408, 410, 412, 414, and/or 416.

As with machine-readable storage medium 304 of FIG. 3, machine-readable storage medium 404 may be any suitable physical storage device that stores executable instructions. Instructions 406, 408, and 410 on machine-readable storage medium 404 may be analogous to instructions 306, 308, and 310, respectively, on machine-readable storage medium 304. Instructions 410 may determine whether vibration notifications have not been received from consecutive vibration sensors in an identified subset of a plurality of vibration sensors. Instructions 412 may activate emergency brakes of a train in response to a determination that vibration notifications have not been received from consecutive vibration sensors in the subset. For example, the identified subset may be a group of vibration sensors within a certain distance in front of the train (i.e., in the direction the train is moving), and the determination that vibration notifications have not been received from consecutive vibration sensors in the subset may indicate that part of the track in front of the train is broken or cracked. Instructions 412 may activate emergency brakes of the train to prevent the train from reaching the broken/cracked part of the track and derailing.

Instructions 414 may determine, based on a list of sensor identification codes and data indicative of physical locations of the respective vibration sensors, a physical location of a vibration sensor, in the subset, from which a vibration notification was not received. The list may be stored machine-readable storage medium 404 or in another part of device 400. In some implementations, instructions 414 may use geographic coordinates in the list to determine where the vibration sensor is physically located, as discussed above with respect to FIG. 1. The absence of an expected vibration notification from the vibration sensor may indicate that the vibration sensor has malfunctioned, or that there is a defect in a portion of track near the vibration sensor.

Instructions 416 may request a repair for a physical location. For example, if an expected vibration notification has not been received from a particular vibration sensor but vibration notifications have been received from vibration sensors on both sides of the particular vibration sensor (e.g., the vibration sensors before and after the particular vibration sensor with respect to a predetermined order), instructions 416 may request that a sensor repair team be sent to the physical location of the particular vibration sensor. If vibration notifications were expected but not received from at least two consecutive vibration sensors in an identified subset, instructions 416 may request that a track repair team check the portion of the track between such vibration sensors for breaks/cracks and repair any such breaks/cracks.

Figure 5:
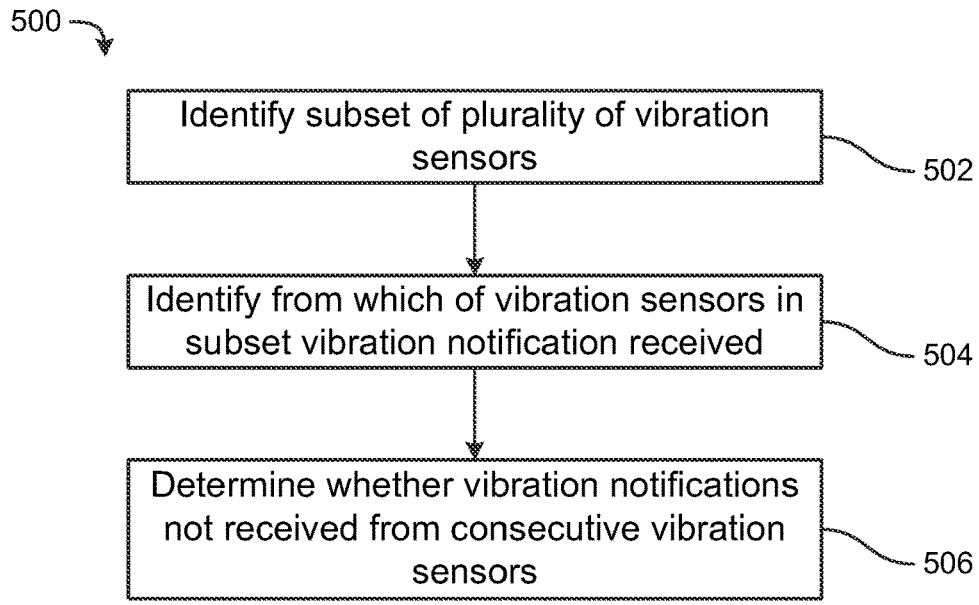
FIG. 5 is a flowchart of an example method for detecting a condition needing repair along a track.
Figure 6:
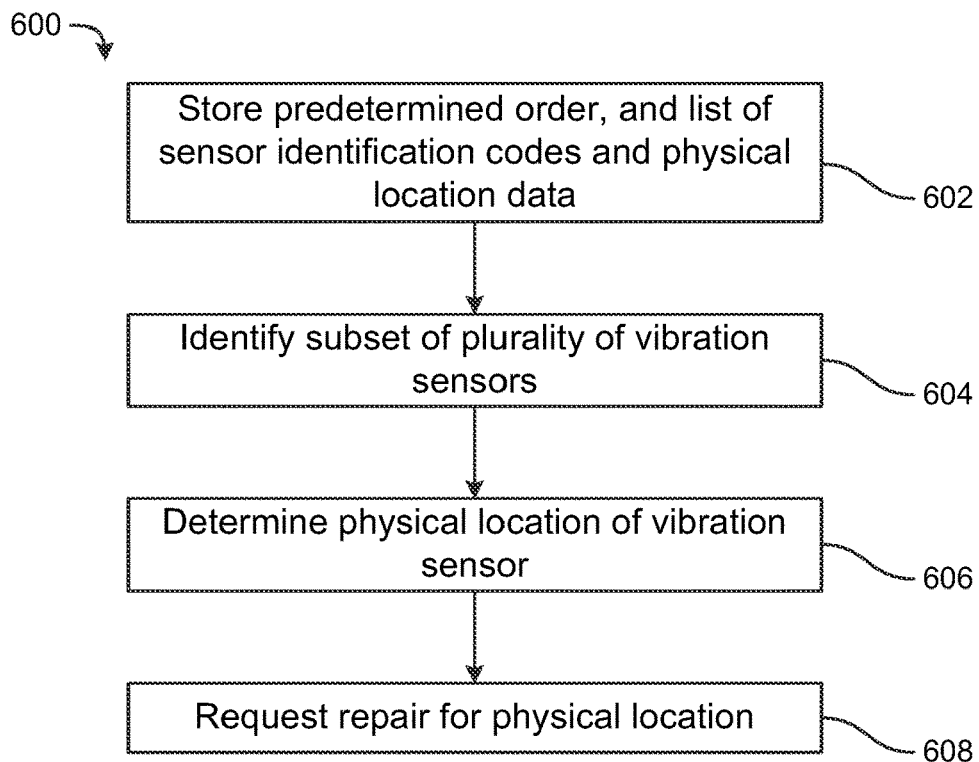
FIG. 6 is a flowchart of an example method for requesting a repair for a location along a track.
Figure 7:
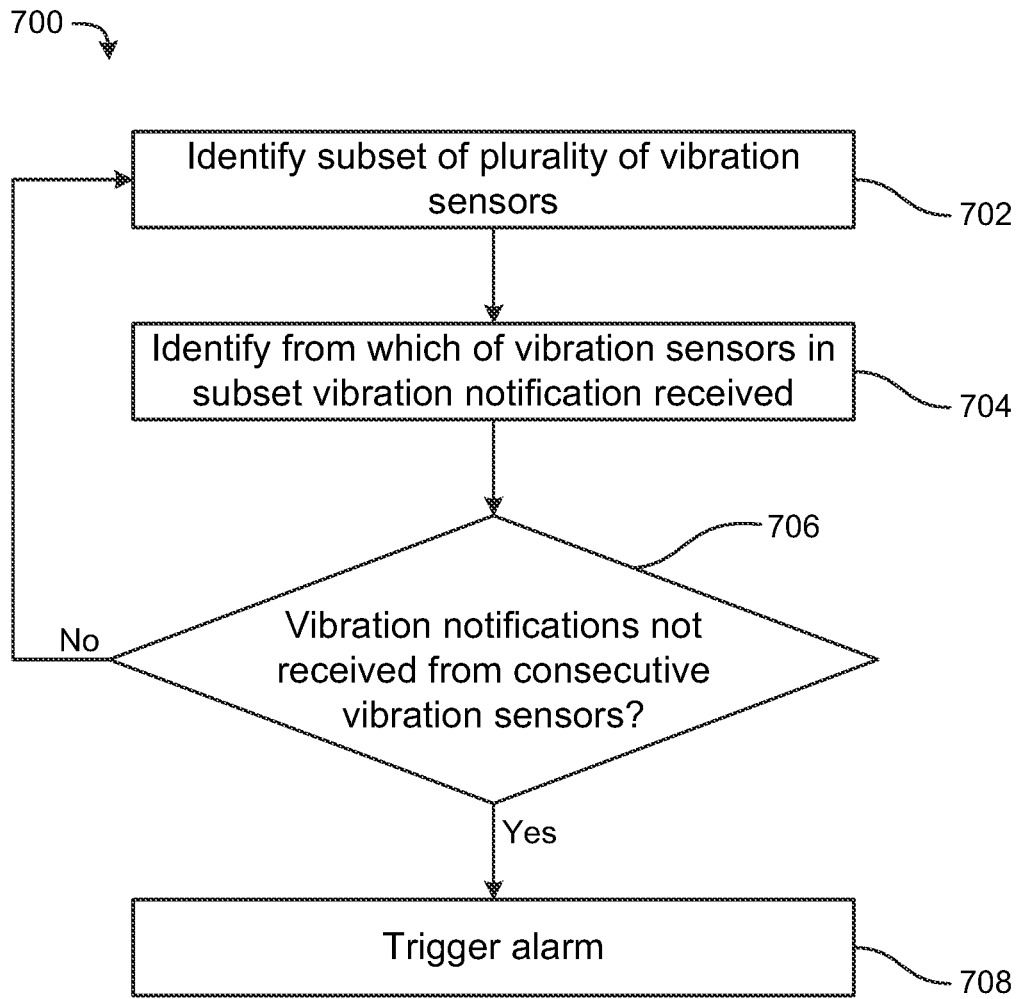
FIG. 7 is a flowchart of an example method for triggering an alarm based on whether expected vibration notifications are received.

Methods related to receiving vibration notifications from vibration sensors are discussed with respect to FIGS. 5-7. FIG. 5 is a flowchart of an example method 500 for detecting a condition needing repair along a track. Although execution of method 500 is described below with reference to processor 302 of FIG. 3, it should be understood that execution of method 500 may be performed by other suitable devices, such as processor 402 of FIG. 4. Method 500 may be implemented in the form of executable instructions stored on a machine-readable storage medium and/or in the form of electronic circuitry.

Method 500 may start in block 502, where processor 302 may identify, based on a position of a train along a track, a subset of a plurality of vibration sensors from which vibration notifications are expected. The plurality of vibration sensors may be arranged in a predetermined order on the track. In some implementations, the subset may be identified based on which of the plurality of vibration sensors are less than a predetermined distance from the train. In some implementations, the vibration sensors in the subset may be the vibration sensors in the vicinity of the train that should experience vibration levels above a threshold level if the track is defect-free, as discussed above with respect to FIG. 1.

In block 504, processor 302 may identify, based on received sensor identification codes, from which of the vibration sensors in the subset a vibration notification has been received. For example, processor 302 may compare received sensor identification codes to sensor identification codes corresponding to vibration sensors in the subset and identify matches. Processor 302 may determine that the vibration sensors corresponding to the matching sensor identification codes are the vibration sensors from which a vibration notification has been received.

In block 506, processor 302 may determine whether vibration notifications have not been received from consecutive, with respect to the predetermined order, vibration sensors in the subset. For example, processor 302 may determine whether any of the vibration sensors that are in the subset and that were not identified in block 504 are adjacent to one another in the predetermined order. In some implementations, processor 302 may determine whether vibration notifications have not been received from any consecutive pairs of vibration sensors (or from any group of three consecutive vibration sensors, or any other number of consecutive vibration sensors) within the subset, as discussed above with respect to FIG. 1.

FIG. 6 is a flowchart of an example method 600 for requesting a repair for a location along a track. Although execution of method 600 is described below with reference to processor 402 of FIG. 4, it should be understood that execution of method 600 may be performed by other suitable devices, such as processor 302 of FIG. 3. Some blocks of method 600 may be performed in parallel with and/or after method 500. Method 600 may be implemented in the form of executable instructions stored on a machine-readable storage medium and/or in the form of electronic circuitry.

Method 600 may start in block 602, where processor 402 may store a predetermined order of a plurality of vibration sensors on a track, and a list of sensor identification codes and data indicative of physical locations of the respective vibration sensors. For example, processor 402 may store a list of sensor identification codes, corresponding to respective vibration sensors on a track, in the order that the vibration sensors are placed on the track, and geographic coordinates for the physical location of at least some of the vibration sensors. In some implementations, processor 402 may store indications of physical locations of some vibration sensors relative to those of other vibration sensors, as discussed above with respect to FIG. 1.

In block 604, processor 402 may identify, based on a position of a train along the track, a subset of the plurality of vibration sensors from which vibration notifications are expected. In some implementations, the subset may be identified based on which of the plurality of vibration sensors are less than a predetermined distance from the train. In some implementations, the vibration sensors in the subset may be the vibration sensors in the vicinity of the train that should experience vibration levels above a threshold level if the track is defect-free, as discussed above with respect to FIG. 1.

In block 606, processor 402 may determine, based on the list, a physical location of a vibration sensor, in the subset, from which a vibration notification was not received. In some implementations, processor 402 may use geographic coordinates in the list to determine where the vibration sensor is physically located, as discussed above with respect to FIG. 1. The absence of an expected vibration notification from the vibration sensor may indicate that the vibration sensor has malfunctioned, or that there is a defect in a portion of track near the vibration sensor.

In block 608, processor 402 may request a repair for the physical location. For example, if an expected vibration notification has not been received from a particular vibration sensor but vibration notifications have been received from vibration sensors on both sides of the particular vibration sensor (e.g., the vibration sensors before and after the particular vibration sensor with respect to a predetermined order), processor 402 may request that a sensor repair team be sent to the physical location of the particular vibration sensor. If vibration notifications were expected but not received from at least two consecutive vibration sensors in the identified subset, processor 402 may request that a track repair team check the portion of the track between such vibration sensors for breaks/cracks and repair any such breaks/cracks.

FIG. 7 is a flowchart of an example method 700 for triggering an alarm based on whether expected vibration notifications are received. Although execution of method 700 is described below with reference to processor 302 of FIG. 3, it should be understood that execution of method 700 may be performed by other suitable devices, such as processor 402 of FIG. 4. Some blocks of method 700 may be performed in parallel with and/or after method 500 or 600. Method 700 may be implemented in the form of executable instructions stored on a machine-readable storage medium and/or in the form of electronic circuitry.

Blocks 702 and 704 of FIG. 7 may be analogous to blocks 502 and 504, respectively, of FIG. 5. In block 706, processor 302 may determine whether vibration notifications have not been received from consecutive, with respect to a predetermined order, vibration sensors in an identified subset of vibration sensors. For example, if some vibration notifications have been received, processor 302 may use sensor identification codes received with the vibration notifications to determine which members of the subset transmitted the vibration notifications, and determine whether any of the rest of the members of the subset are adjacent to one another in the predetermined order. In some implementations, processor 302 may determine whether vibration notifications have not been received from any consecutive pairs of vibration sensors (or from any group of three consecutive vibration sensors, or any other number of consecutive vibration sensors) within the subset, as discussed above with respect to FIG. 1.

If, in block 706, processor 302 determines that there are no consecutive vibration sensors, in the subset, from which vibration notifications have not been received, method 700 may loop back to block 702. If, in block 706, processor 302 determines that vibration notifications have not been received from consecutive vibration sensors in the subset, method 700 may proceed to block 708, in which processor 302 may trigger an alarm. In some implementations, the alarm may indicate that the train should be stopped or re-routed. For example, such an alarm may be triggered if the consecutive vibration sensors from which expected vibration notifications were not received are in front of the train (i.e., the train is moving toward such vibration sensors).

The foregoing disclosure describes receiving vibration notifications from vibration sensors along tracks. The vibration sensors may be powered by vibrations along the track and may not need an external power source, minimizing maintenance and operational costs. An alarm indicative of a defect in a track may not be triggered unless multiple consecutive vibration sensors do not transmit vibration notifications, reducing false positives and increasing fault tolerance.

We claim:

1. A system comprising:
   a plurality of vibration sensors arranged in a predetermined order on a track, wherein each of the plurality of vibration sensors is to:
      generate electrical charge in response to vibrations;
      transmit vibration notifications in response to vibration levels above a threshold level; and
      transmit, with each vibration notification, a sensor identification code stored on the respective vibration sensor; and
   a receiver module to:
      receive vibration notifications and sensor identification codes from the plurality of vibration sensors;
      identify, based on a position of a train along the track, a subset of the plurality of vibration sensors from which vibration notifications are expected; and
      determine whether vibration notifications have not been received from consecutive, with respect to the predetermined order, vibration sensors in the subset;
   wherein the receiver module is communicatively coupled to the plurality of vibration sensors and to the train.

2. The system of claim 1, wherein each of the plurality of vibration sensors comprises:
   a power storage module to store generated electrical charge;
   a vibration detection module to determine whether vibration levels experienced by the respective vibration sensor exceed the threshold level; and
   an amplification module to use electrical charge stored in the power storage module to boost electrical signals used to transmit the vibration notifications and sensor identification code, wherein the vibration notifications and sensor identification code are wirelessly transmitted.

3. The system of claim 1, wherein the receiver module is further to:
   store the predetermined order of the plurality of vibration sensors, and a list of sensor identification codes and data indicative of physical locations of the respective vibration sensors;
   determine, based on the list, a physical location of a vibration sensor, in the subset, from which a vibration notification was not received.

4. The system of claim 3, wherein the receiver module is further to request a repair for the physical location.

5. The system of claim 1, wherein vibration sensors in the subset are vibration sensors that the train is traveling toward and that are less than a predetermined distance from the train, and wherein the receiver module is further to activate emergency brakes of the train in response to a determination that vibration notifications have not been received from consecutive vibration sensors in the subset.

6. The system of claim 1, wherein the receiver module is on the train.

7. The system of claim 1, wherein the receiver module is in a location from which the train receives control signals.

8. A non-transitory machine-readable storage medium encoded with instructions executable by a processor, the machine-readable storage medium comprising:
   instructions to identify, based on a position of a train along a track, a subset of a plurality of vibration sensors from which vibration notifications are expected, wherein the plurality of vibration sensors are arranged in a predetermined order on the track;
   instructions to determine whether vibration notifications have not been received from consecutive, with respect to the predetermined order, vibration sensors in the subset; and
   instructions to trigger an alarm in response to a determination that vibration notifications have not been received from consecutive vibration sensors in the subset.

9. The non-transitory machine-readable storage medium of claim 8, further comprising instructions to activate emergency brakes of the train in response to a determination that vibration notifications have not been received from consecutive vibration sensors in the subset.

10. The non-transitory machine-readable storage medium of claim 8, further comprising instructions to determine, based on a list of sensor identification codes and data indicative of physical locations of the respective vibration sensors, a physical location of a vibration sensor, in the subset, from which a vibration notification was not received.

11. The non-transitory machine-readable storage medium of claim 10, further comprising instructions to request a repair for the physical location.

12. A method comprising:
   identifying, based on a position of a train along a track, a subset of a plurality of vibration sensors from which vibration notifications are expected, wherein the plurality of vibration sensors are arranged in a predetermined order on the track;
   identifying, based on received sensor identification codes, from which of the vibration sensors in the subset a vibration notification has been received; and
   determining whether vibration notifications have not been received from consecutive, with respect to the predetermined order, vibration sensors in the subset.

13. The method of claim 12, wherein the subset is identified based on which of the plurality of vibration sensors are less than a predetermined distance from the train.

14. The method of claim 12, further comprising:
   storing the predetermined order of the plurality of vibration sensors, and a list of sensor identification codes and data indicative of physical locations of the respective vibration sensors;
   determining, based on the list, a physical location of a vibration sensor, in the subset, from which a vibration notification was not received; and
   requesting a repair for the physical location.

15. The method of claim 12, further comprising triggering an alarm in response to a determination that vibration notifications have not been received from consecutive vibration sensors in the subset.

* * * * *